United States Patent [19]
Cushenbery

[11] 4,180,252
[45] Dec. 25, 1979

[54] VEHICLE DOOR AND BUMPER LIFT

[76] Inventor: James D. Cushenbery, 207 S. Buckner, Derby, Kans. 67037

[21] Appl. No.: 972,235

[22] Filed: Dec. 22, 1978

[51] Int. Cl.² .............................................. B23Q 3/00
[52] U.S. Cl. .................................... 269/17; 254/9 B; 254/122; 254/126
[58] Field of Search ................. 269/17; 254/9 R, 9 B, 254/9 C, 122, 126, 133, 134

[56] References Cited
U.S. PATENT DOCUMENTS

| 1,973,308 | 9/1934 | Geistlinger | 254/126 |
| 2,799,920 | 7/1957 | Hansen | 269/17 |
| 3,858,864 | 1/1975 | Waldow | 269/17 |
| 3,928,946 | 12/1975 | Wynn | 254/126 X |
| 4,025,053 | 5/1977 | Stickle | 254/122 |
| 4,029,308 | 6/1977 | Mathers | 269/17 |

Primary Examiner—Robert C. Watson
Attorney, Agent, or Firm—Edwin H. Crabtree

[57] ABSTRACT

A lift for raising and lowering a vehicle door, bumper or other vehicle parts adjacent a vehicle when installing or removing the parts from the vehicle. The lift eliminates the need of physical labor to hold the door or bumper in place when performing body repair on the vehicle.

7 Claims, 5 Drawing Figures

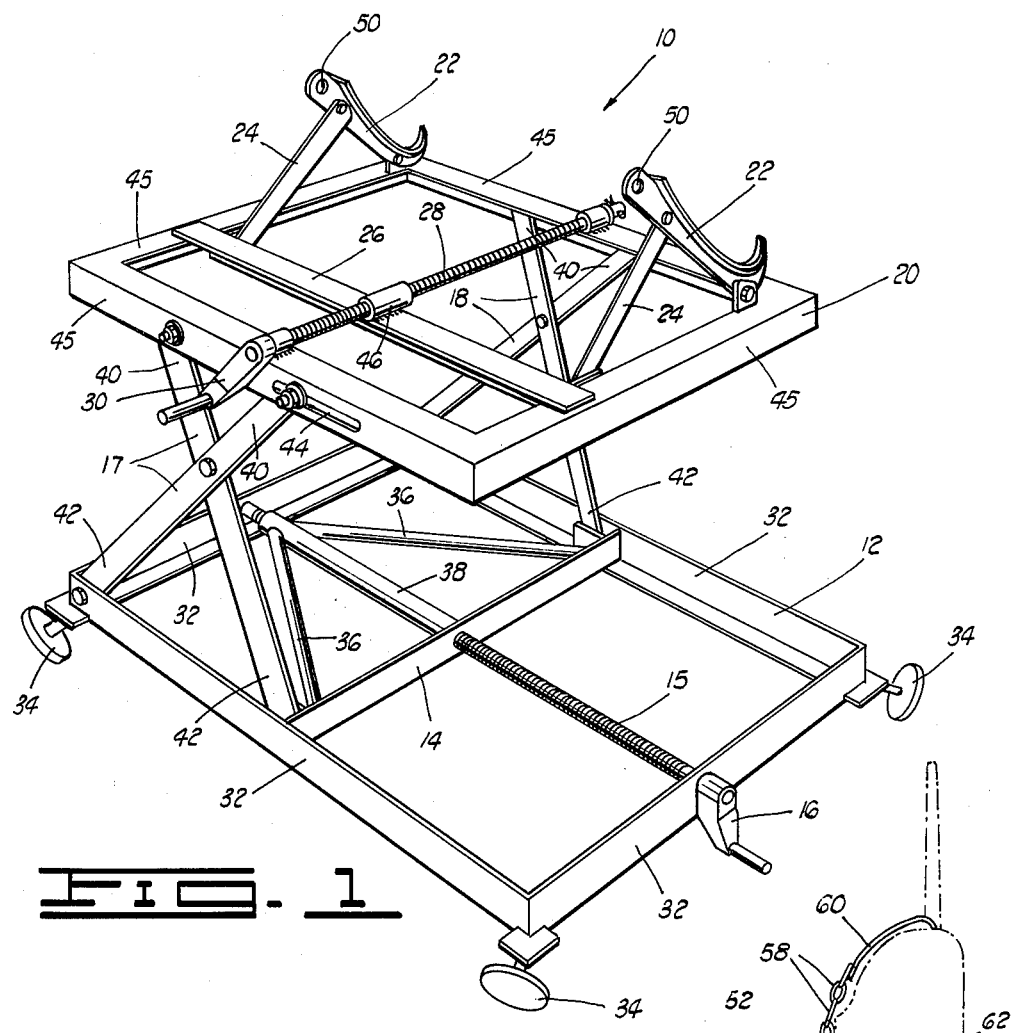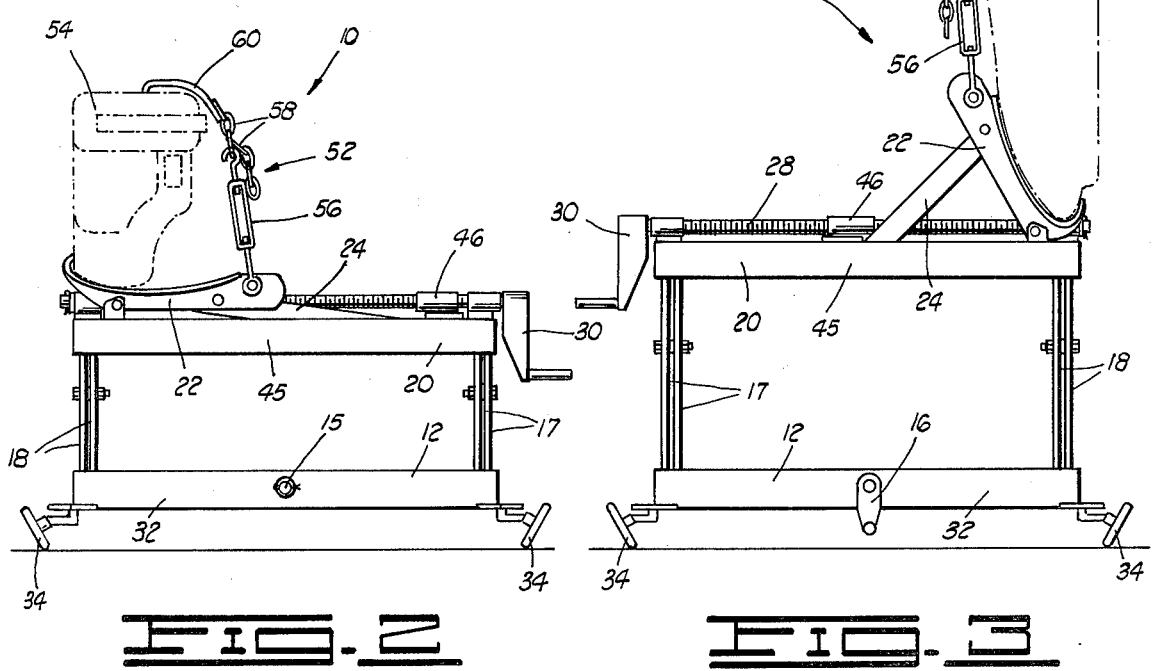

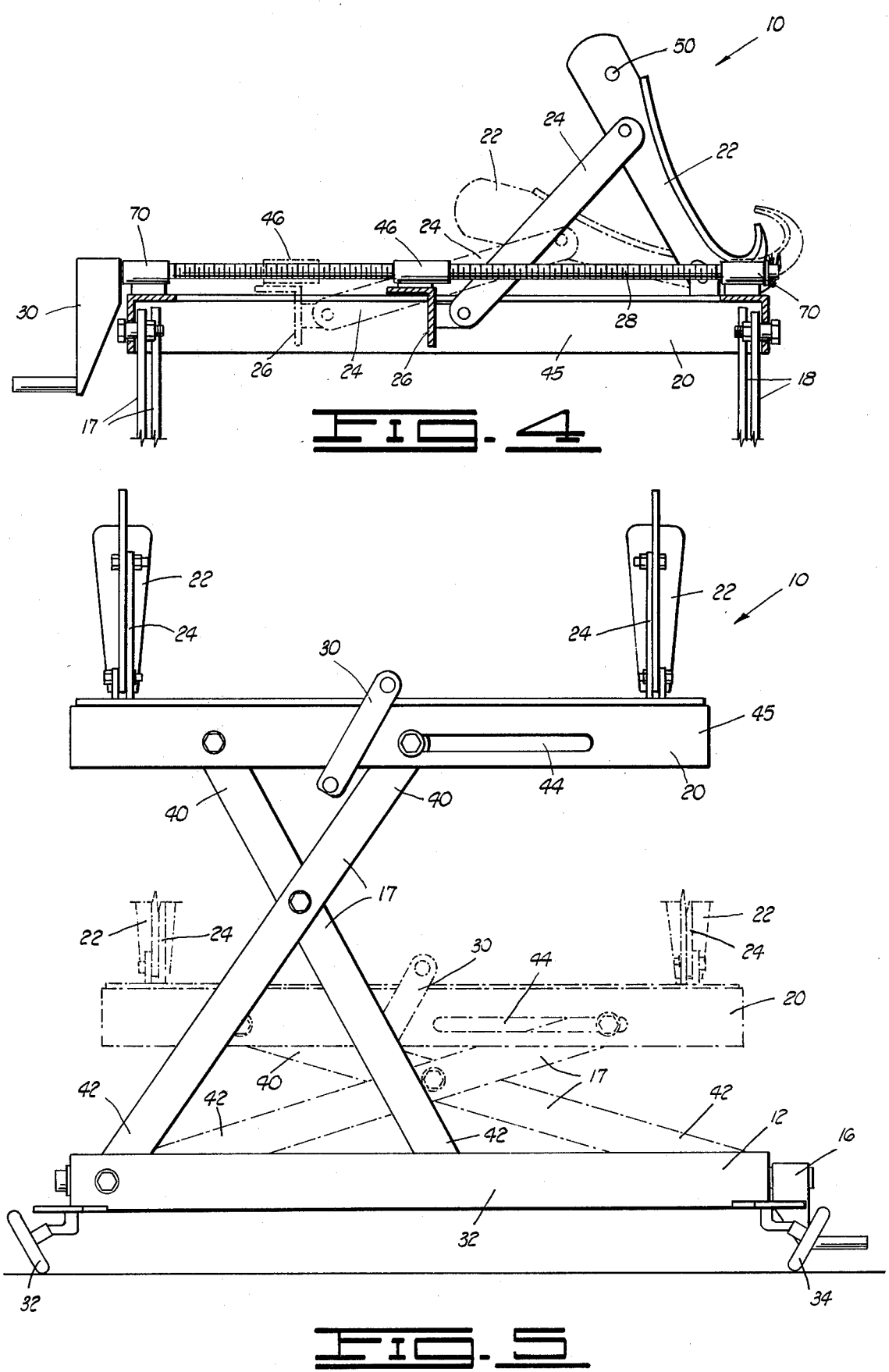

VEHICLE DOOR AND BUMPER LIFT

BACKGROUND OF THE INVENTION

This invention relates to a lift for raising and lowering objects thereon and in particular, but not by way of limitation, to a vehicle door and bumper lift used in repair work on a vehicle.

Heretofore there have been various types of vehicle scissor jacks, hydraulic jacks, and different types of retractable jacks. These jacks were used primarily for tire repair or for raising and lowering the vehicle so that the vehicle may be leveled. None of the prior art jacks or vehicle lifts prove the novel structure for holding a vehicle door or bumper in place when repairs are made on the vehicle.

SUMMARY OF THE INVENTION

This invention holds a vehicle door, bumper or other vehicle parts in place adjacent a vehicle so that the parts may be installed or removed without having to physically manhandle the parts when they are removed or installed.

The lift may be raised or lowered depending on the height of the door, bumper or the like on a vehicle. Also the parts may be raised or lowered on the lift for proper adjustment during the installation.

The lift is simple in design, rugged in construction, and reduces labor required in vehicle body work. The invention is easy to use and rigidly holds a vehicle door or bumper in place. Also the lift eliminates back strain and the possibility of dropping the door or bumper when manually installing the vehicle part.

The vehicle door and bumper lift includes a wheel mounted lower frame having a lower cross arm slidably mounted thereon. Attached to the lower cross arm is a lower screw with a lower screw handle. A first pair of pinned scissor arms and a second pair of pinned scissor arms are crossed and pivotally pinned together intermediate an upper end portion and a lower end portion of the arms. One of the lower end portion of the arms is pivotally pinned to the lower frame. The other lower end portion of the arms is attached to the lower cross arm. An upper frame is disposed above and parallel to the lower frame. The upper frame is pinned to one of the upper end portion of the scissor arms with the other upper end portion of the arms slidably attached to the upper frame. By rotating the lower screw with the lower screw handle the lower cross arm raises and lowers the scissor arms thereby raising and lowering the upper frame. A pair of J-shaped hooks having an upper end portion and a lower end portion is pivotally pinned to the upper frame. A pair of hook arms are pivotally pinned to the upper end portion of the hooks and to an upper cross arm. The upper cross arm is slidably mounted on the upper frame and is attached to an upper screw. The upper screw is attached to the upper frame and includes an upper screw handle for rotating the upper screw. By rotating the upper screw with the upper screw handle the upper cross arm raises and lowers the hook arms and the J-shaped hooks. The J-shaped hooks receive the vehicle door or bumper thereon and are secured thereto by an attachment chain or the like.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a perspective view of the vehicle door and bumper lift.

FIG. 2 is a side view of the lift with a vehicle bumper attached to the J-shaped hooks of the lift.

FIG. 3 is a side view of the lift with a vehicle door attached to the J-shaped hooks of the lift.

FIG. 4 is a partial side view of the lift with the J-shaped hooks partially lowered and in a lowered position shown in dotted lines.

FIG. 5 is a front view of the lift with the upper frame in a raised position and in a lowered position shown in dotted lines.

DETAILED DESCRIPTION OF THE DRAWINGS

In FIG. 1 the vehicle door and bumper lift is designated by general reference numeral 10. The lift 10 includes a wheel mounted lower frame 12, a lower cross arm 14, a lower screw 15 with a lower screw handle 16, a first pair of scissor arms 17, a second pair of scissor arms 18, an upper frame 20, a pair of J-shaped hooks 22, a pair of hook arms 24, an upper cross arm 26, and an upper screw 28 with an upper screw handle 30.

The lower frame 12 is constructed of L-shaped angle arm members 32. Mounted on the corners of the lower frame 12 are caster wheels 34 so that the lift can be easily moved thereon.

The lower cross arm 14 includes arm braces 36 attached to the ends of the cross arm 14 and a threaded nut 38 for receiving a portion of the lower screw 15. The ends of the lower cross arm 14 are slidably mounted on top of opposite angle arm members 32 of the frame 12.

The ends of the lower screw 15 are secured to opposite angle arm members 32 and when the lower screw handle 16 is rotated the lower screw 15 slides the cross arm 14 laterally on top of the lower frame 12.

The pair of first scissor arms 17 and second pair of scissor arms 18 are pivotally pinned together intermediate upper end portions 40 and lower end portions 42 of the arms 17 and 18. One of the lower end portions 42 of the arms 17 and 18 are pivotally pinned to the lower frame 12. The other lower end portions 42 of the arms 16 and 18 are attached to the lower cross arm 14.

One of the upper end portions 40 of the scissor arms 17 and 18 is pivotally pinned to the upper frame 20. The other upper end portions 40 of the scissor arms 17 and 18 are slidably mounted in an elongated slot 44 in the opposite sides of the upper frame 20. When the lower screw 15 is rotated by the lower screw handle 16 and the lower cross arm 14 slides on the lower frame 12, the scissor arms 17 and 18 raise and lower the upper frame 20 with one of the upper end portions of the scissor arms 17 and 18 sliding in the slot 44. In FIG. 1 only one slot 44 can be seen in the side of the upper frame 20 although there is an identical slot 44 in the opposite side of the frame 20.

The upper frame 20 is made of L-shaped angle arm members 45 similar to the members 32 of the lower frame 12. The ends of the upper cross arm 26 slide on top of opposite members 45 of the upper frame 20. The upper cross arm 26 includes a threaded nut 46 for receiving the upper screw 28. The ends of the upper screw 28 are attached to opposite sides of the upper frame 20. The lower end of the hook arms 24 are attached to the upper cross bar 26. The upper ends of the hook arms 24 are pivotally pinned to the upper end of each J-shaped hook 22. The lower ends of the J-shaped hooks 22 are pivotally pinned to one of the members 45 of the upper frame 20.

By rotating the upper screw 28 with the upper screw handle 30 the upper cross arm 26 is moved laterally on top of the upper frame 20 thereby raising and lowering the hook arms 24 and the J-shaped hooks 22.

The upper end of the J-shaped hooks include an aperture 50 therethrough for attaching one end of an attachment chain 52 shown in FIG. 2 and FIG. 3.

In FIG. 2 a side view of the lift 10 can be seen with the upper frame 20 partially lowered above the lower frame 12. In this view the J-shaped hooks 22 can be seen completely lowered by the upper screw 28 for receiving a vehicle bumper 54 thereon. The bumper 54 is shown in dotted lines and is secured on top of the J-shaped hooks 22 by the attachment chain 52. The attachment chain 52 is shown with a swivel hook 56, link chain 58 and a J-shaped arm 60 attached to the bumper 54.

In this view the bumper is positioned so that the lift 10 can be moved in front or the rear of the vehicle with the bumper 54 in a position for easy attachment to the vehicle without having to manually lift or position the bumper as it is secured to the vehicle.

In FIG. 3 a side view of the lift 10 is seen with the upper frame 20 raised in an extended position above the lower frame 12 with a vehicle door 62 mounted on the J-shaped hooks 22. The J-shaped hooks 22 have been raised upwardly by the upper screw 28 for receiving the vehicle door 62 thereon. The vehicle door 62 is rigidly secured to the J shaped hooks 22 by the attachment chain 52. As mentioned above, the lift 10, when properly positioned, places the vehicle door 62 adjacent the door opening in the vehicle so that the door 62 need not be lifted manually while performing repair work on the vehicle.

In FIG. 4 a partial side view of the lift 10 is shown. In this view an enlargement of the upper frame 20 is shown with the upper screw 28 attached thereto. The ends of the upper screw 28 are attached to mounting brackets 70 secured to opposite sides of the upper frame 20. The J-shaped hooks 22 are shown in a partially raised position. The position of the J-shaped hooks 22 will vary depending on the contour of the bumper 54, vehicle door 62 or any other repair part mounted thereon. The adjustment of the hooks 22 also allows for proper alignment when the vehicle part is being bolted or welded to the vehicle body.

The J-shaped hooks 22 are also shown in FIG. 4 in a completely lowered position shown in dotted lines. In this position the upper cross arm 26 has moved from right to left with the hook arms 24 lowering the J-shaped hooks 22 as the threaded nut 46 moves to the left on the upper screw 28. In the lowered position the J-shaped hooks 22 are in a position for receiving a bumper similar to the bumper 54 illustrated in FIG. 2.

In FIG. 5 a front view of the lift 10 is shown with the upper frame in a partially raised position above the lower frame 12. In this view the rear of the J-shaped hooks 22 can be seen attached to the upper frame 20 and hook arms 24.

By rotating the lower screw handle 17 and turning the lower screw 15, the lower cross arm 14 may be moved from left to right lowering the first pair of scissor arms 17 and second pair of scissor arms 18. As the scissor arms 17 and 18 are lowered, one of the upper end portions 40 of the scissor arms 17 and 18 slide in the elongated slot 44 in the upper frame 20. By allowing the upper end portions of the scissor arms 17 and 18 to slide from left to right in the slot 44, the scissor arms 17 and 18 are lowered on the lower frame 12 and in turn, lower the upper frame 20.

The lift 10, by providing means for lowering and raising the upper frame 20 on the lower frame 12, the vehicle bumper 54 or vehicle door 62 can be properly adjusted for the height required on installing these vehicle parts on the vehicle.

Changes may be made in the construction and arrangement of the parts or elements of the embodiments as described herein without departing from the spirit or scope of the invention defined in the following claims.

I claim:

1. A vehicle door and bumper lift, the lift comprising:
   a wheel mounted lower frame;
   a lower cross arm slidably mounted on said lower frame;
   a first pair of pinned scissor arms, said arms crossed and pivotally pinned together intermediate an upper end portion and a lower end portion of said arms, one lower end portion of said arms pivotally pinned to said lower frame, the other lower end portion of said arms attached to said lower cross arm;
   an upper frame disposed above said lower frame and parallel thereto, said upper frame pivotally pinned to one upper end portion of said arms and slidably attached to the other upper end portion of said arms;
   means for raising and lowering said scissor arms attached to said lower frame and threadably attached to said lower cross arm;
   a J-shaped hook having an upper end portion and a lower end portion, the lower end portion of said J-shaped hook pivotally pinned to said upper frame;
   a hook arm having one end pivotally pinned to the upper end portion of said hook;
   an upper cross arm slidably mounted on said upper frame, said cross arm attached to the other end of said hook arm; and
   means for raising and lowering said hook arm attached to said upper frame and threadably attached to said upper cross arm.

2. The lift as described in claim 1 wherein said means for raising and lowering said scissor arms is a lower screw attached to said lower frame and threadably attached to said lower cross arm and having a lower screw handle, by rotating said lower screw handle said lower cross arm is slided on said lower frame thereby raising and lowering said scissor arms and said upper frame.

3. The lift as described in claim 1 wherein said means for raising and lowering said hook arm is an upper screw attached to said upper frame and threadably attached to said upper cross arm and having an upper screw handle, by rotating said upper screw handle said upper cross arm is slid on said upper frame thereby raising and lowering said hook arm and said hook.

4. The lift as described in claim 1 further including a pair of J-shaped hooks, the lower end portions of said hooks pivotally pinned to said upper frame, the upper end portions of said hooks pivotally pinned to a pair of hook arms, said hook arms attached to said upper cross arm.

5. The lift as described in claim 4 further including means for securing the vehicle door and the bumper to said J-shaped hooks.

6. A vehicle door and bumper lift, the lift comprising:
a wheel mounted lower frame;
a lower cross arm slidably mounted on said lower frame;
a lower screw attached to said lower frame and threadably attached to said lower cross arm, said lower screw having a lower screw handle attached at one end thereof;
a first pair of pinned scissor arms and a second pair of pinned scissor arms, said arms crossed and pivotally pinned together intermediate an upper end portion and a lower end portion of said arms, one lower end portion of said arms pivotally pinned to said lower frame, the other lower end portion of said arms attached to said lower cross arm;
an upper frame disposed above said lower frame and parallel thereto, said upper frame pivotally pinned to one upper end portion of said arms and slidably attached to the other end portion of said arms, by rotating said lower screw with said lower screw handle, said lower cross arm raises and lowers said scissor arms thereby raising and lowering said upper frame;
a pair of J-shaped hooks having an upper end portion and a lower end portion, the lower end portion of said hooks pivotally pinned to said upper frame;
a pair of hook arms, one end of said hook arms pivotally pinned to the upper end portion of said hooks;
an upper cross arm slidably mounted on said upper frame, said upper cross arm attached to the other end of said hook arms; and
an upper screw attached to said upper frame and threadably attached to said upper cross arm, said upper screw having an upper screw handle attached at one end thereof, by rotating said upper screw with said upper screw handle, said upper cross arm raises and lowers said hook arms thereby raising and lowering said J-shaped hooks.

7. The lift as described in claim 6 further including an attachment chain for securing the vehicle door and the bumper to said J-shaped hooks.

* * * * *